Oct. 3, 1961 W. K. WILKINSON 3,002,958
PROCESS FOR POLYMERIZING MONOMERIC MIXTURES
Filed July 30, 1958
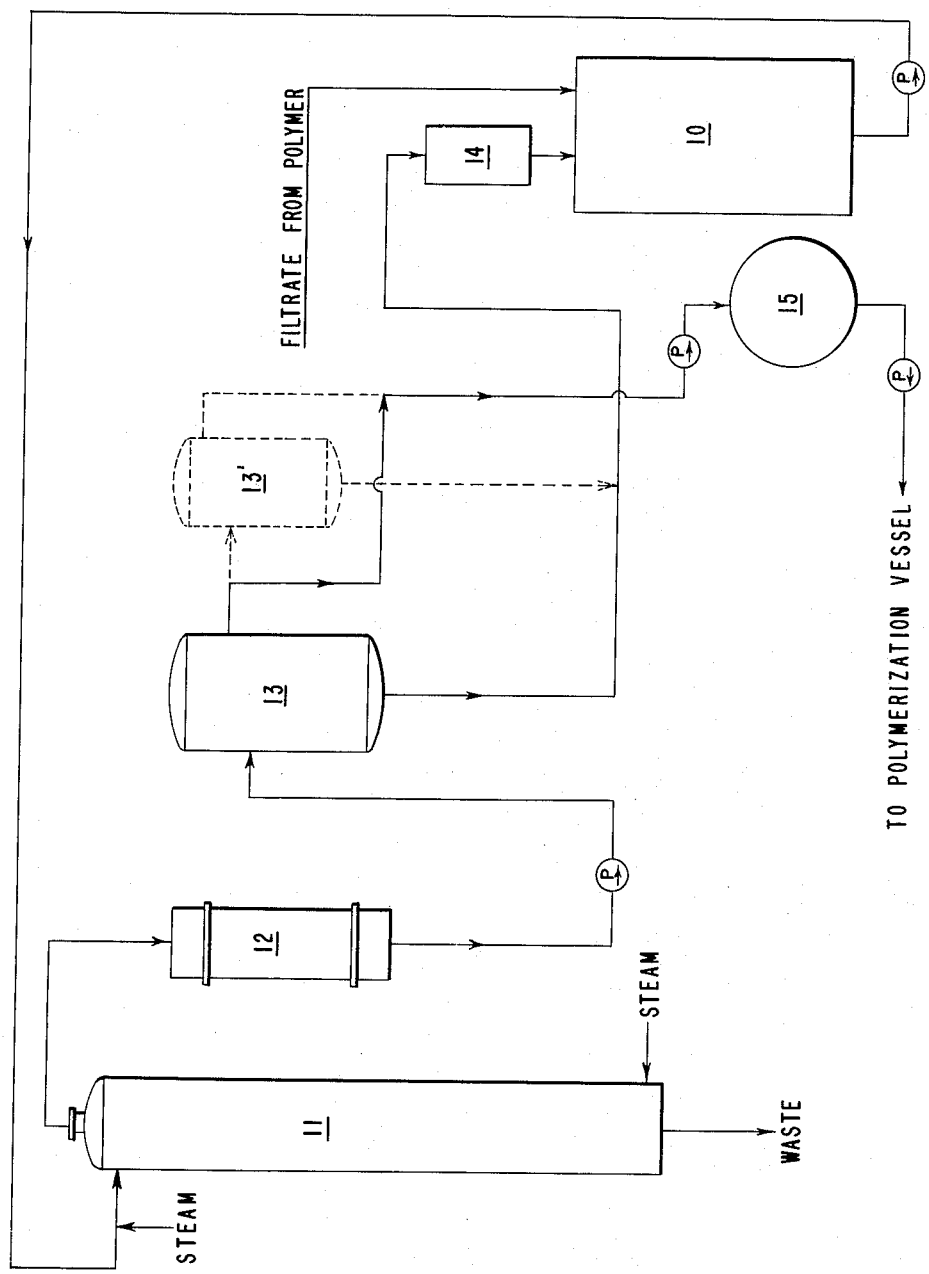
INVENTOR
WILLIAM K. WILKINSON
BY
ATTORNEY

United States Patent Office 3,002,958
Patented Oct. 3, 1961

3,002,958
PROCESS FOR POLYMERIZING MONOMERIC MIXTURES
William K. Wilkinson, Waynesboro, Va., assignor to E. I. du Pont de Nemours and Company, Wilmington, Del., a corporation of Delaware
Filed July 30, 1958, Ser. No. 752,108
7 Claims. (Cl. 260—85.5)

This invention relates to the polymerization of mixtures of acrylonitrile and an acrylic ester, and more particularly to a process for recovering mixtures of unreacted monomers of acrylonitrile and said ester which have passed through a polymerization process.

In the continuous aqueous polymerization of monomer mixtures, such as those containing about 85% acrylonitrile and up to about 15% of an acrylic ester, about 65% to 90% of each of the monomers fed to the reaction vessel is converted into polymer. In order to make the process commercially feasible, the unreacted monomers, which appear in a concentration from about 0.5% to about 2.0% in the filtrate obtained after washing the precipitated copolymer, must be recovered and the impurities, such as small amounts of catalyst and activator, must be removed.

In the aqueous polymerization of pure acrylonitrile, the unreacted monomer is readily recovered and impurities are removed by a known steam distillation process. In such a process the filtrate containing the monomer is fed to a stripping column into which steam is continuously introduced. The vapors evolving from the top of the column are collected and condensed, with the fluid flowing out at the bottom of the column being discarded. The condensate forms two layers, the upper layer consisting of acrylonitrile saturated with about 3% water and the lower layer consisting of water saturated with about 7% acrylonitrile. The acrylonitrile layer is returned to the polymerization reaction vessel directly. The water layer is decanted back into the feed stream entering the stripping column.

Although the process just described works well in a recovery system for polymerizing acrylonitrile, unfortunately the process has been found to be inoperable in the recovery of unreacted monomers in the copolymerization of acrylonitrile and acrylic esters. This inoperability is due to the formation of a stable water-monomer emulsion in the stripping column and decanter due to the presence of a volatile water-soluble emulsion stabilizing agent which is formed during the polymerization process. This problem has persisted even though the utmost care has been taken in controlling the purity of the materials used in the polymerization process and in performing the stripping operation. For lack of a solution to the problem, the industry has been forced to shut down the equipment frequently and clean out the water-monomer emulsion. Operating in such a manner has been costly, not only from the standpoint of time lost in equipment shutdowns and in cleaning out the recovery system, but also in view of the fact that a significant amount of the monomers is necessarily discarded each time the system is cleaned.

It is, therefore, an object of this invention to provide a process for recovering unreacted monomers in the copolymerization of acrylonitrile and acrylic esters. It is another object of this invention to provide a process for removing impurities from an aqueous mixture of acrylonitrile and an acrylic ester which adversely affect monomer recovery. It is a further object of this invention to provide a process for removing impurities from the monomer mixture which includes a water-soluble emulsion stabilizing agent which is volatile with steam that is formed during the polymerization of acrylonitrile and an acrylic ester. Other objects will be apparent from the following discussions.

The objects of this invention are accomplished in a process which comprises recovering unreacted acrylonitrile and acrylic ester from an aqueous slurry containing precipitated acrylonitrile/acrylic ester copolymer by filtering the polymer slurry, washing the filter cake with water and collecting the aqueous filtrate, distilling the filtrate, collecting and condensing the vapors whereby two liquid layers are formed, returning the top layer to the polymerization vessel, passing the bottom layer through a cation exchange material, and thereafter returning the bottom layer to the distillation apparatus where it is combined with the filtrate. Surprisingly, the emulsion stabilizing agent is removed by the cation exchange material, thereby allowing the monomer recovery process to be operated without interruption.

In general, the process may be carried out effectively by collecting the dilute aqueous filtrate and feeding it to the top of a fractionating or stripping column which contains from about twenty to one hundred plates. Sufficient steam is introduced in the column near the filtrate entrance site to heat the filtrate to boiling. Additional steam is introduced at the bottom of the column for stripping the monomers from the filtrate. The stripped aqueous solution, containing various non-volatile impurities, flows from the bottom of the column and is discarded. The monomer and vapor mixture leaving the top of the column consists essentially of a constant boiling azeotropic mixture which boils at about 70° C. The vapors from the column, consisting essentially of steam and monomer vapor, are condensed and separate into two liquid layers. The bottom layer consists of water saturated with about 7% of the monomers; the top layer consists of monomers saturated with about 3% of water. The top layer is returned without further treatment to the polymerization vessel, and the bottom layer, which contains traces of the emulsion stabilizing agent, is passed through a cationic exchange material and is returned to the top of the stripping column where it is combined with other filtrate. The fluid coming from the ion exchange column is checked from time to time to determine when the ion exchange material needs to be regenerated. Generally, when an amount of the fluid from the column is shaken with an equal amount of pure acrylonitrile and an emulsion is formed which lasts three hundred seconds or longer, the ion exchange material should be regenerated. If the emulsion lasts for five hundred seconds or longer, the stripping column and decanter become inoperatively clogged with a stable emulsion, making separation of monomer from water impossible. The top portion of the decanter contains so much water and impurities that it is unusable in the polymerization process; and the bottom portion being returned to the stripping column contains so much monomer that it causes the stripping column to surge, foam and become upset to such an extent that monomer is lost through the bottom of the stripping column.

In the drawing, FIGURE 1 is a flow diagram illustrating the process of this invention. Filtrate obtained from washing the precipitated polymer with deionized water is fed to a stainless steel feed tank 10. The filtrate is pumped from the tank to a sieve-plate stripping column 11 where sufficient steam to heat the filtrate to boiling is introduced into the feed line entering the column. Additional steam is introduced at the bottom of column 11. The vapors coming from the top of the column are directed to a condenser 12 where two liquid phases form. The aqueous solution collected at the bottom of column 11 is disposed of as waste. If desired, the condensate may be further cooled and is then pumped to decanter 13 where the two liquid phases separate into layers. The bottom layer, consisting of water containing about 7% acrylonitrile and acrylic ester monomers, is fed to ion exchange column 14 which contains a cation exchange material where the emulsion stabilizing agent is removed. The top layer from decanter 13 consisting of monomers containing about 3% water is fed to a suitable receiver 15 and is then pumped back to the polymerization vessel. If desired, the top layer may be fed to a second decanter 13' to effect a further separation of the water and monomer layers; however, this is not necessary for satisfactory operation of the monomer recovery process.

As previously indicated, the problem of emulsion formation occurs only in copolymerizing acrylonitrile and an acrylic ester. In polymerizing pure acrylonitrile and recovering the unreacted monomer no problem is experienced; however, as the acrylic ester is added to the polymerization vessel feed stream, the presence of an emulsion stabilizing agent can be detected by the formation of a stable emulsion, first in the decanter and eventually throughout the recovery system. The rate of emulsifier buildup becomes quite rapid in compositions containing more than 1% of the acrylic ester and soon reaches an intolerable level unless the filtrate is treated according to the process of this invention. The types of acrylic esters which lead to emulsion problems are those steam-volatile esters represented by the general formula

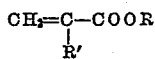

wherein R is alkyl or aryl and R' is hydrogen, alkyl or aryl.

Little is known about the specific structure of the emulsion stabilizing agent or agents. In fact, it is surprising that an emulsifying agent appears in the condensate collected from the stripping column since mass spectographic analysis of the recovered monomer mixture fails to reveal the presence of any impurities which are not present when pure acrylonitrile monomer is being polymerized. Even more surprising is the fact that the emulsifying agents can be removed by a cation exchange material since no impurities can be detected which are known to be removed by cation exchange. It is believed, however, that the agents are organic amines, containing an acrylic ester in the molecule, which are formed by the reaction of ammonia or an amine with the acrylic ester at sometime during the polymerization step. The source of ammonia or amines may be stabilizers which are initially contained in fresh, pure acrylonitrile or hydrolytic side reaction products formed during polymerization. The agents are apparently more soluble in water than acrylonitrile or the acrylic ester since they appear in the water layer in the decanter. In addition, they are volatile with steam since they appear in the vapors collected from the stripping column.

In practicing the present invention, the inorganic salt content of the monomer feed stream resulting from activator, catalyst, polymerization inhibitor and other impurities, appears to have no bearing on emulsion formation during the monomer recovery operation. Since deionized water is used in washing the polymer, generally using about eight pounds of water for each pound of polymer, the water does not affect the formation of a stable emulsion. Under normal operating conditions, the filtrate will contain in the range of about 0.2% to about 1.5% non-volatile inorganic salts. None of the salts have been detected in the condensate from the stripping column.

The following examples are given to further illustrate the process of this invention without intending any limitation thereof.

EXAMPLE I

The following ingredients were continuously added in the proportions indicated to a cylindrical reaction vessel:

|  | Parts |
| --- | --- |
| Acrylonitrile | 2068 |
| Methyl acrylate | 132 |
| Sodium styrenesulfonate | 5.7 |
| Potassium persulfate | 5.7 |
| Sodium meta-bisulfite | 88 |
| p-Methoxyphenol | 0.04 |
| Water (plus $H_2SO_4$ to pH 3.6) | 7700.6 |

As the ingredients were added, the vessel was continuously agitated. The temperature was maintained at about 45° C. A precipitate formed in the vessel. As the slurry overflowed from the vessel, it was passed to a sodium bicarbonate short-stopping tank which was maintained at a temperature of 40° C. and thereafter filtered. The polymer cake was washed with deionized water at the rate of eight pounds of water per pound of polymer. The filtrate was cooled and found to contain 1.0% acrylonitrile, 0.05% methyl acrylate and 0.003% sodium styrene-sulfonate, 0.2% inorganic salts and 0.7 p.p.m. p-methoxyphenol. The filtrate was fed into the top of a 30-plate fractionating column at the rate of 2000 pounds per hour. Sufficient steam was added to the column just below the twenty-eighth plate to heat the feed to boiling. Steam was admitted at the bottom of the column at the rate of 200 pounds per hour. The vapors coming from the top of the column were cooled, condensed and pumped to the decanter where two layers formed. The top layer, consisting of 92.5% acrylonitrile, 4.5% methyl acrylate, and 3.0% water, was drawn off for recycling to the polymerization vessel. The bottom layer, consisting of 93.0% water, 6.7% acrylonitrile, and 0.3% methyl acrylate, was fed into an ion exchange column five and one-half feet wide and six feet high which contained 3500 pounds of a strongly acidic cross-linked polystyrene cation exchange resin manufactured by the Rohm & Haas Company and sold under the trade name "Amberlite IR-120." The rate of flow through the ion exchange column was 6000 pounds per hour. The fluid leaving the column was tested for emulsifier content by shaking 10 grams of the solution with 10 grams of fresh acrylonitrile. The emulsion which formed broke within five seconds. The exit fluid was then returned to the top of the stripping column.

The degree of saturation of the resin bed with emulsifier was checked periodically. When a test emulsion obtained by shaking equal amounts of the exit fluid and pure acrylonitrile persisted for 300 seconds, the ion exchange resin was regenerated using 10% sulfuric acid.

EXAMPLE II

Example I was repeated except the bottom layer from the decanter was returned to the stripping column, bypassing the ion exchange column. The process was operated only with great difficulty due to monomer-emulsion build-up in the decanter. After cleaning the decanter, it would refill with emulsion in thirty-six to forty-eight hours.

From this example it can be seen that the concentration of the emulsifier increases over a period of time and that cleaning out the emulsion formed in the system does not solve the problem.

EXAMPLE III

Example I was repeated except that a sample of the bottom layer of liquid from the decanter was passed at a rate of 20 ml. per minute through a column one inch in diameter and twelve inches long of each of the materials listed in the following table. The effluents were tested for emulsifying content by shaking equal amounts of the effluents and fresh, pure acrylonitrile and observing the time needed for breaking the emulsion, i.e., the length of time necessary for the aqueous phase and the acrylonitrile phase to form a single planar interface.

*Table*

| Ion exchange material: | Emulsion stability (minutes) |
|---|---|
| None | 36 |
| Activated charcoal | 34 |
| "Amberlite IRA-400"* (OH)[1] | 35 |
| "Amberlite IRA-400"* (Cl)[2] | 34 |
| "Amberlite IRA-400"* (Cl) +activated charcoal | 33 |
| "Amberlite IRC-50"* (Na)[3] | 3 |
| "Amberlite IRC-50"* (H)[4] | 4 |
| "Amberlite IR-120"* (H)[5] | 0 |
| "Amberlite IR-120"* (Na)[6] | 0 |

* Trade name of Rohm & Haas Company.
[1] A polystyrene based, quaternary amine anion exchange resin, in hydroxide form, described in U.S. Patent 2,591,573;
[2] A polystyrene based, quaternary amine anion exchange resin, in chloride form, described in U.S. Patent 2,591,573;
[3] A carboxylic acid, cation exchange resin, in sodium form;
[4] A weakly acidic carboxylic acid cation exchange resin in acid form;
[5] A strongly acidic cross-linked polystyrene cation exchange resin in acid form;
[6] A strongly acidic cross-linked polystyrene cation exchange resin in sodium form.

It will be noted that neither activated charcoal nor an anion exchange resin or a combination of the two was effective in reducing the emulsion stabilizing agent content of the effluent.

EXAMPLE IV

An aqueous solution obtained from filtering and washing an acrylonitrile/methyl acrylate copolymer (94/6) precipitated from an aqueous system as described in Example I containing 2.8% acrylonitrile and 0.14% methyl acrylate, 0.13% inorganic salts was fed into the top of a 30-plate, sieve-plate column at the rate of 2000 pounds per hour. Sufficient steam was added to the column just below the twenty-eighth plate to heat the feed to boiling. Additional steam was admitted at the bottom of the column at the rate of 200 pounds per hour. The overhead vapors were condensed and pumped to a decanter where two layers formed. The top layer, consisting of 93% acrylonitrile, 4% methyl acrylate, and 3% water was removed for recycling to the polymerization reaction. The bottom layer comprised of 93% water, 6.7% acrylonitrile, 0.3% methyl acrylate and an amount of emulsifier so that ten grams of the solution when shaken with ten grams of fresh, pure acrylonitrile gives an emulsion which took more than 1000 seconds to break. The bottom decanter layer was led to the top of an ion exchange column five and one-half feed wide, six feet high, and containing 3,500 pounds of the sodium form of a sulfonic acid cation exchange resin manufactured by the Rohm & Haas Company, sold under the trade name "Amberlite IR-120." The rate of flow downward through the ion exchange column was 6,000 pounds per hour, and the exit fluid, when tested as above for emulsifier content, yielded an emulsion which broke in eight seconds. The exit fluid thus purified of emulsifier was returned to the top of the 30-plate stripper column. The degree of saturation of the resin bed with emulsifier was monitored by making periodic tests of the exit fluid for emulsifier by shaking equal amounts of the exit fluid with fresh, pure acrylonitrile. When a test emulsion persisted for 300 seconds, the exchange resin was regenerated with 10% sodium chloride.

In addition to the cationic exchange materials described in the foregoing examples, other materials such as the sulfonated phenolformaldehyde condensation products, catechol-tannin-formaldehyde condensation products, aromatic sulphonic-formaldehyde condensation products, as well as sulfonated polystyrene divinylbenzene resins, the preparation of which is described in U.S. Patents 2,204,539 and 2,366,007, may be used. Included among other cation exchange materials are numerous trade name materials which are commercially available.

While the emphasis in the examples has been on recovering unreacted monomers in the polymerization of the acrylonitrile and methyl acrylate mixtures, this invention is applicable to the recovery of monomers in the polymerization of a monomeric mixture of at least 85% acrylonitrile and up to about 15% of other acrylic esters. For example, acrylates and methacrylates such as ethyl, propyl, butyl, isobutyl and methyloxyethyl, as well as aromatic acrylic esters such as phenyl acrylate, phenyl-alpha-methyl acrylate, phenyl-alpha-phenyl acrylate, methyl-alpha-phenyl acrylate, etc., may be substituted for the methyl acrylate in the examples in like amounts. In addition, from 0.1% to about 5.0% of a salt of a styrene-sulfonic acid may be included in the monomeric mixture.

Various modifications in the apparatus described for carrying out the process of this invention will be obvious. For example, a packed column or a bubble-cap column rather than a sieve-plate column may be used to carry out the steam distillation. The arrangement of the decanter and collecting vessels obviously is not a limiting feature of the present invention.

By means of this invention it is possible to accomplish considerable savings both in time and materials in the continuous polymerization of acrylonitrile/acrylic ester monomers. The process is readily controllable and does not require expensive equipment or chemicals to accomplish removal of the emulsion stabilizing agent formed during the polymerization process.

Throughout the specification and claims any reference to parts, proportions and percentages refers to parts, proportions and percentages by weight unless otherwise specified.

It will be apparent that many widely different embodiments of this invention may be made without departing from the spirit and scope thereof, and therefore it is not intended to be limited except as indicated in the appended claims.

I claim:
1. In a continuous process for polymerizing in an aqueous medium, a monomeric mixture of at least 85% acrylonitrile and up to about 15% of an acrylic ester having the general formula

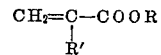

wherein R is selected from the class consisting of alkyl and aryl groups, and R' is selected from the class consisting of hydrogen, alkyl, and aryl groups, and recovering unpolymerized monomers, the improvement which comprises removing a volatile, water-soluble emulsion stabilizing agent formed during the polymerization of said monomers by aqueous washing and filtering the polymerization product, distilling the filtrate, collecting and condensing the vapors to form two liquid layers, separating said layers, returning the top layer to polymerization vessel, first passing the bottom layer through a synthetic water-insoluble cationic exchange resin, and thereafter combining said bottom layer with said filtrate.

2. The process of claim 1 wherein said acrylic ester is methyl acrylate.

3. The process of claim 1 wherein said cationic exchange material is comprised of a polystyrene-divinyl-benzene resin.

4. In a process for recovering unreacted monomers in the aqueous copolymerization of a monomer mixture consisting of at least 85% acrylonitrile and up to about 15% of an acrylic ester having the general formula

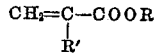

wherein R is selected from the class consisting of alkyl and aryl groups, and R' is selected from the class consisting of hydrogen, alkyl, and aryl groups, the improvement which comprises removing a volatile, water-soluble emulsion stabilizing agent formed during the polymerization of said monomers by aqueous washing and filtering the precipitated copolymer, steam distilling the aqueous solution obtained by said filtration, collecting and condensing the vapors evolved to form two liquid layers, returning the top layer to a polymerization vessel, passing the bottom layer through a synthetic water-insoluble cationic exchange resin to remove said emulsion stabilizing agent, and thereafter combining said bottom layer with said aqueous solution.

5. The process of claim 4 wherein said acrylic ester is methyl acrylate.

6. The process of claim 4 wherein said cationic exchange material is comprised of a polystyrenedivinylbenzene resin.

7. In a continuous process for copolymerizing a monomer mixture of at least 85% acrylonitrile and up to about 15% methyl acrylate and recovering unreacted acrylonitrile and methyl acrylate monomers, the improvement which comprises washing the precipitated copolymer with water, separating said copolymer from the aqueous solution, feeding said solution to a stripping column heated to a temperature from about 70° C. to about 100° C., condensing the vapors evolving from the top of said column to form two liquid layers, separating said layers and returning said top layer consisting of a major portion of the unreacted monomers to a polymerization vessel, passing said bottom layer consisting of a major portion of water through an ion exchange column containing a synthetic water-insoluble cationic exchange resin to remove said emulsion stabilizing agent, and thereafter returning said bottom layer to the stripping column.

References Cited in the file of this patent

UNITED STATES PATENTS 2,514,207    Johnson _____ July 4, 1950